Figure 1:
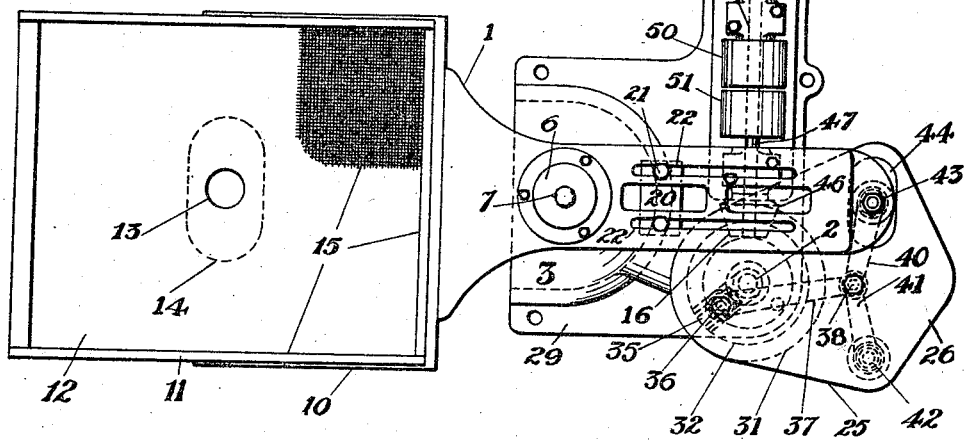

H. MUELLER.
POTTER'S LAWN.
APPLICATION FILED JAN. 2, 1917.

1,286,720.

Patented Dec. 3, 1918.

INVENTOR,
Hilmar Mueller,
BY
Hull, Smith, Brock & West
ATTORNEY

UNITED STATES PATENT OFFICE.

HILMAR MUELLER, OF TRENTON, NEW JERSEY.

POTTER'S LAWN.

1,286,720. Specification of Letters Patent. Patented Dec. 3, 1918.

Application filed January 2, 1917. Serial No. 140,052.

*To all whom it may concern:*

Be it known that I, HILMAR MUELLER, a citizen of the United States, residing at Trenton, in the county of Mercer and State of New Jersey, have invented a certain new and useful Improvement in Potters' Lawns, of which the following is a full, clear, and exact description, reference being had to the accompanying drawings.

This invention relates to apparatus or machines that are used for separating foreign substances or impurities, such as particles of wood, iron, sand and small stones, from clay employed by potters for the manufacture of earthenware. Machines of this character are known as lawns, and the kinds that are at present in use are either of the revolving, or the shaking class.

Machines of the former, or revolving, class can only be used where the clay body consists of a thin mixture and does not contain much of what is known as "ball clay". Where much ball clay is used in the body a lawn of the second, or shaking, class is required. Heretofore, so far as I am aware, shaking lawns have comprised screen boxes which are supported by springs, links, or the like, or are mounted to slide, and are reciprocated by cranks, cams, or eccentrics. Machines of this character are inefficient, and are short lived, because of the more or less complicated suspension structures and operating mechanisms that have had to be associated with them and which are required to operate in the presence of sand or grit, with the result that they are rapidly worn out, and operate with considerable friction, and consequently at a great loss of power.

Moreover it has been found that some clay bodies require a longer stroke in the separating process than others, and the prevailing constructions of shaking lawns provide for no adjustment whereby this end may be attained.

It is the objects of my invention to construct a lawn of the shaking class which is highly efficient; extremely easy of operation; is very durable; is comparatively simple of construction; and wherein the length of stroke may be varied to suit the requirements of the different qualities of clay to be treated.

A further action which is highly desirable in the treatment of clay of the above character is to impart to the clay slip (as the thin clay body is called) a shorter stroke at the moment it is introduced upon the screen or sieve than is given it at the completion of the operation, and the length and violence of the stroke should gradually increase during the progress of the material along the screen. Therefore, a further object comprehended by my invention is the production of a lawn wherein this result may be readily attained.

Figure 2:
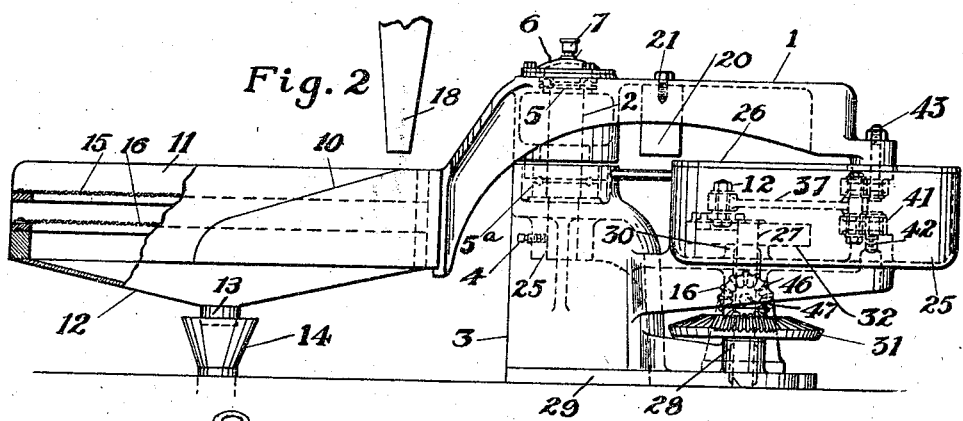
Figure 3:
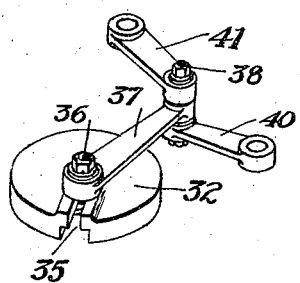

To these ends my invention consists in the production of a lawn involving a movement novel to apparatus or machines of this character, and comprising the elements set forth in the claims annexed hereto, and an embodiment of which is illustrated in the drawing accompanying and forming a part hereof, wherein Figure 1 is a plan view and Fig. 2 a side elevation of a lawn constructed in accordance with my invention; and Fig. 3 is a detail, in perspective of certain of the elements of the operating mechanism.

Describing the present embodiment of my invention by the use of reference characters, 1 represents a rocker arm which is journaled intermediate its ends upon a vertical shaft 2 whose lower end is shown as secured within a socket in the base 3 by means of a set screw 4. Ball bearings 5 and $5^a$ are employed to reduce the friction between the rocker arm and its support, and a cap 6 closes the upper end of the opening of the rocker arm occupied by the shaft 2, the cap being shown as provided with an oil cup 7 through which the working parts beneath may be lubricated. I do not consider this construction of the rocker arm support particularly essential, and the dotted line showing thereof is deemed sufficient; but I do consider it important that the rocker arm be pivotally supported to swing in substantially a horizontal plane, for reasons which will be given hereinafter.

To the forward end of the rocker arm there is secured an open sided frame 10 within which is supported a box 11 having the upper portion of its side remote from the frame 10 open. The box is provided with a bottom 12 which is inclined downward from the side walls toward the center where it is equipped with a discharge spout 13 which reposes above the funnel shaped, transversely elongated receiver 14. An upper and a lower screen 15 and 16, respectively, each of which is stretched upon a suitable frame, are supported within the box 11; and following a practice which prevails in shaking lawns, the lower screen is preferably of a finer mesh than the upper. Clay slip is adapted to be delivered, as by a spout 18, onto the end of the upper screen 15 nearest the pivotal support of the rocker arm, and, in the operatiton of the machine, to gradually flow toward the open or discharge side of the box, the slip passing through the screens 15 and 16 and falling upon the bottom 12 by which it is collected and discharged through the spout 13 into the receiver 14, while any foreign matter which was in the slip will pass on across the screens and out of the discharge or open side of the box.

20 denotes a counterweight attached to the end of the rocker arm 1 opposite the screen box 11 by cap screws 21 which pass through slots 22 in the top web of the arm 1. This screw and slot arrangement allows the weight 20 to be adjusted longitudinally of the arm to balance the screen box and material thereon. This renders the bearing of the arm upon the shaft 2 practically free from friction and insures ease of operation and durability to the parts.

To the rear and to one side of the base 3 there is supported from the base a casing 25 that is open at the top but for the presence of a cover 26 which may be attached to the casing by any suitable means. A shaft 27 is supported vertically within a boss 28 of the bottom plate 29 of the base and within a hollow boss 30 formed in the bottom of the casing 25. Immediately above the boss 28, a bevel gear 31 is secured to the shaft 27, and a disk 32 is secured to the upper end of the shaft within the casing 25. This disk has a radial slot 35 that is T shaped in cross section and within which is adapted to be clamped at any radius from the center of the disk, a crank pin 36 to one end of which is pivoted a connecting arm 37 which has its opposite end journaled, by means of a knuckle pin 38, to the knee of a toggle joint 37 comprising links 40 and 41, the former having its outer end journaled upon a stationary pin 42 which is screwed into a pad that drives from the bottom of the casing 25, and the latter having its outer end pivoted upon a pin 43 that depends from the rear end of the rocker arm 1, the cover 26 of the casing 25 being slotted at 44 to permit of such connection between the rocker arm and the link 41.

Meshing with the bevel gear 31, is a pinion 46 of like character that is secured to the end of a shaft 47 supported within the journals 48 which rise from the bottom plate 29 of the base 3 and between which are pulleys 50 and 51, one of which is secured to the shaft 47, while the other is loose thereon. This pulley equipment provides for an operation of the machine by means of a belt, although it is obvious that the shaft may be driven by a motor or other suitable means.

With the foregoing construction in mind, it will be readily seen that when the shaft 47 is driven, the disk 32 will be rotated through the pinion 46, gear 31, and shaft 27. As the disk 32 is rotated, the links 40 and 41 of the toggle joint will be oscillated through their connection, by means of the connecting arm 37, with the crank-pin of the disk. The outer end of the link 40 being fixed against any but an oscillatory movement, it is clear that the outer end of the link 41 must move to and fro in a transverse direction, whereby the rocker arm will be vibrated to shake the screen box 11. The extent of this movement may be readily varied by an adjustment of the crank pin 36 within the radial slot 35 of the disk 32. The elongation of the receiver 14 allows for the transverse movement of the spout 13. The screen box, swinging in an arc upon the center defined by the shaft 2, imparts a shorter movement to the inner or receiving ends of the screens 15 and 16 than is given their outer ends. Consequently, the desired result hereinbefore set forth is attained.

It will be observed that the working parts and the operating mechanisms of the machine are not only removed from the vicinity of the material that is being handled, but are actually protected from dust by their inclosing casings.

Having thus described my invention, what I claim is:—

1. In apparatus of the character set forth, the combination of a vertical shaft, a rocker arm journaled for oscillation in a horizontal plane thereon, a screen carried by the arm on one side of said shaft and having a discharge side remote from the shaft, a weight carried by the arm on the other side of the shaft, and means for oscillating the arm.

2. In apparatus of the character set forth, the combination of a pivotally supported rocker arm pivotally supported for oscillation in a horizontal plane, a screen carried by the arm on one side of its pivotal support and having a discharge side remote from said support, a weight carried by the arm on the other side of its pivotal support, and means for oscillating the arm.

3. In apparatus of the character set forth, the combination of a rocker arm pivotally supported for oscillation in a horizontal plane, a screen carried by the arm on one side of its pivotal support and having a discharge side remote from said support, a weight adjustably carried by the arm on the other side of its pivotal support, and means for oscillating the arm.

4. In apparatus of the character set forth, the combination of a rocker arm pivotally supported for oscillation in a horizontal plane, a screen carried by the rocker arm on one side of its pivotal support and having a discharge side remote from said support, a toggle joint having the outer end of one of its links connected to the rocker arm and the outer end of its other link pivotally supported in fixed relation to the pivoted support of the rocker arm, and mechanism having connection with the knee of the toggle joint for swinging the same.

5. In apparatus of the character set forth, the combination of a base, a rocker arm pivotally supported thereon for oscillation in a horizontal plane, a screen carried by the rocker arm on one side of its pivoted support and having a discharge side remote from said support, a toggle joint having the outer end of one of its links connected to the rocker arm and the outer end of its other link pivotally supported in fixed relation to the base, and variable throw mechanism having connection with the knee of the toggle joint for swinging the same.

6. In apparatus of the character set forth, the combination of a base, a rocker arm pivotally supported thereon for oscillation in a horizontal plane, a screen carried by the arm on one side of its pivotal support and having a discharge side remote from said support, a toggle joint having the outer end of one of its links pivotally connected to the rocker arm and the outer end of its other link pivotally supported in fixed relation to the base, a crank supported by the base and having a radially adjustable pin, means connecting the pin of the crank with the knee of the toggle joint, and means for rotating the crank.

7. In apparatus of the character set forth, the combination of a base, a rocker arm pivotally supported thereon for oscillation in a horizontal plane, a screen box carried by the rocker arm on one side of its pivotal support and having a discharge side remote from said support, a toggle joint having the outer end of one of its links pivotally connected to the end of the rocker arm opposite the screen box and the outer end of its other link pivotally supported in fixed relation to the base, a shaft supported by the base, a disk carried by said shaft, a crank pin carried by the disk, a link connecting the crank pin with the knee of the toggle joint, and mechanism upon the base for driving the aforesaid shaft.

8. In an apparatus of the character set forth, the combination of a pivotally supported rocker arm, adjustable means for oscillating said arm in a horizontal plane through a variable angle, a screen box carried by said arm on one side of its pivotal support, and means for depositing material to be treated upon the side of the screen box nearest the pivotal support, the screen box having an open discharge side remote from the pivotal support.

In testimony whereof I hereunto affix my signature in the presence of two witnesses.

HILMAR MUELLER.

Witnesses:
HERBERT P. MARGERUM,
FRANCIS S. FARLEY.

Copies of this patent may be obtained for five cents each, by addressing the "Commissioner of Patents, Washington, D. C."